Figures 1, 2:
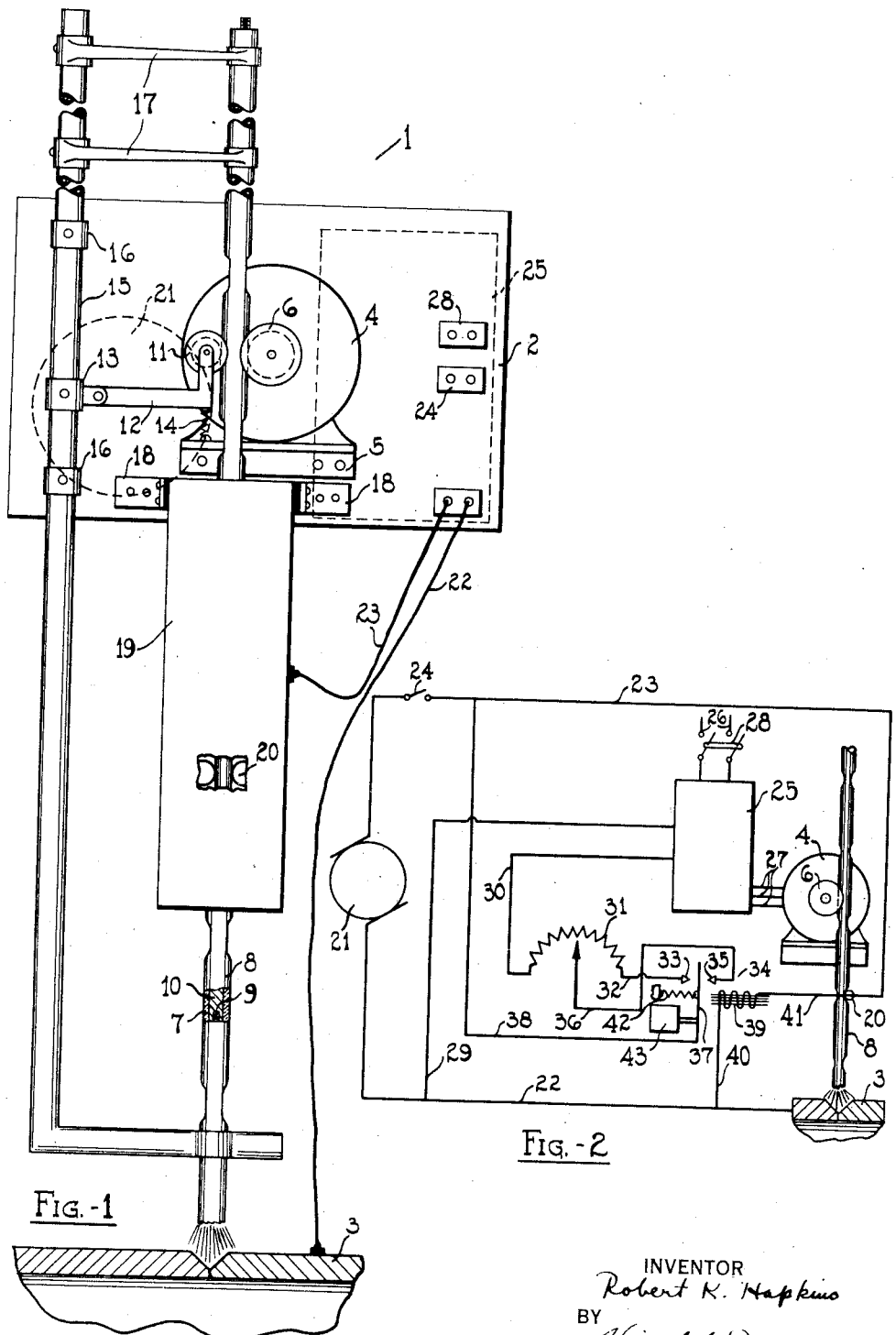

Nov. 26, 1935.  R. K. HOPKINS  2,022,084
ARC STRIKING CONTROL
Filed May 25, 1933

INVENTOR
Robert K. Hopkins
BY
Virgil F. Davies
ATTORNEY

Patented Nov. 26, 1935

2,022,084

UNITED STATES PATENT OFFICE 2,022,084

ARC STRIKING CONTROL

Robert K. Hopkins, New York, N. Y., assignor to M. W. Kellogg Co., New York, N. Y., a corporation of Delaware Application May 25, 1933, Serial No. 672,752

7 Claims. (Cl. 219—8)

This invention relates to electric arc welding and in particular to electric arc welding by means of covered welding electrodes.

It has been found that the automatic welding heads which are at present manufactured commercially are unable to establish an arc when using a covered welding electrode as effectively as when using a bare welding electrode. With these automatic welding heads very little trouble is experienced either in establishing or maintaining an arc of predetermined length when bare welding electrodes are used. However, when covered electrodes are used these automatic welding heads, although they are capable of maintaining an arc of predetermined length, do not readily establish it. The initial arc with covered welding electrodes is usually very short and in some cases the welding electrode buries itself into the work. This is probably due to the fact that with bare welding electrodes the conditions at the arc when the arc is initially struck and when the arc is running are substantially the same, whereas with covered welding electrodes the conditions at the arc when the arc is initially struck and when the arc is running are different. With covered welding electrodes the conditions at the arc when the arc is initially struck are substantially the same as when bare welding electrodes are used, however, when the arc is running because of the ionization of the elements of the covering material the conditions at the arc are greatly changed. Thus with covered welding electrodes the voltage setting of the arc control arrangements which is adjusted to maintain the running arc is not satisfactory for striking and establishing the arc.

I have found that the troubles experienced during the striking of the arc with covered welding electrodes can be avoided and the arc struck much in the same manner as with bare welding electrodes by applying to the arc control arrangements a higher voltage setting, during the establishment of the arc, than is used while welding.

It is an object of this invention to combine with the arc control arrangements of the automatic welding heads commercially manufactured, means for increasing the resistance in the circuit of the arc control arrangements during the establishment of the arc, so that after the initial striking of the arc the feeding of the welding electrode is retarded to increase the length of the arc and thereby prevent the unduly short initial arc or the burying of the welding electrode in the work.

It is also an object of this invention to combine with the arc control arrangements of the automatic welding heads commercially manufactured, automatic means which are operable substantially immediately after the initial striking if the arc to insert resistance in the circuit of the arc control arrangements and maintain said resistance in said circuit for a definite period of time, and after the lapse of said period of time remove the inserted resistance out of said circuit and allow said circuit to be influenced by the voltage setting required to obtain and maintain the arc of desired length.

The invention will be better understood and its further objects and advantages appreciated from a consideration of the following description taken with the accompanying drawing, in which, Fig. 1 is a front elevation of an automatic arc welding machine to which my invention has been applied, and Fig. 2 is a diagrammatic representation of the machine of Fig. 1.

The present invention may be used with all types of automatic arc welding machines arranged to employ covered welding electrodes. For purpose of this disclosure I have chosen to show my invention in connection with an automatic arc welding machine arranged to employ a continuous welding electrode of indefinite length.

Automatic arc welding machine 1 includes a panel 2 that is fastened to supports, not shown, which may be fixed in position or movable relative to work 3. An electrode feeding motor 4 is mounted on a bracket 5, fixed to panel 2, and has fastened to its drive shaft an electrode feeding wheel 6. The peripheral portion of wheel 6 is preferably made of rubber, or similar material, so as not to injure the non-conducting covering 7 of welding electrode 8.

Electrode 8 is made up of a plurality of sections which are easily connectable one to the other, as for instance by the screw joint 9. Each section includes a metallic core 10 and a covering 7 therefor of non-conducting material of suitable composition. As shown non-conducting covering 7 is scored at spaced intervals to expose small areas of core 10 for the passage thereto of the welding current.

A wheel 11, similar to wheel 6, bears on electrode 8 and prevents slippage between wheel 6 and electrode 8. Wheel 11 is supported for rotation in a member 12 which has one end pivoted in pivot member 13. A spring 14 constantly maintains wheel 11 in contact with electrode 8. Pivot member 13 is carried by a support member 15 which is positioned in brackets 16 fastened to the front of panel 2. Support member 15 carries electrode guides 17 at its upper end and has its lower end bent and perforated to allow passage therethrough of electrode 8 for guiding electrode 8 to work 3. Brackets 18 are fastened to panel 2 below bracket 5 and support between them contact device 19, suitable insulation being provided between brackets 18 and contact device 19 to electrically insulate contact device 19 from panel 2. Contact device 19 includes a plurality of vertically spaced contact rollers 20 which are adapted to contact with the exposed areas of electrode 8 on their way to the arc and pass the welding current through them to core 10. A sufficient number of pairs of rollers 20 are provided to continuously pass the welding current to core 10. Contact device 19 will not be described in detail since it, of itself, does not form a part of this invention. However, for a complete description of contact device 19 reference is made to my copending application Serial Number 660,220 filed March 10, 1933, since matured into Patent No. 1,954,999 dated April 17, 1934.

In back of panel 2 is mounted all of the usual elements of an automatic arc welding machine. Those elements which are not part of my invention have not been shown and will not be described.

Welding current generator 21 is mounted in the rear of panel 2 and has one side connected to work 3 by cable 22, the other side being connected to contact device 19 and rollers 20 through cable 23. A switch 24 is included in cable 23. In back of panel 2 is also mounted the arrangements used to control the feeding of the welding electrode 8 and the maintenance of an arc of predetermined length. These arrangements are well known and will not be gone into in detail. For the purpose of this application, the arrangements just mentioned will be considered as located within casing 25. The current for operating electrode feeding motor 4 passes to the control arrangements within casing 25 through line 26 and passes from the control arrangements within casing 25 to motor 4 through line 27. A switch 28 is provided in line 26 so that the flow of energy to motor 4 may be interrupted at will. The control arrangements within casing 25 are connected to cable 22 through conductor 29. These arrangements are also connected to conductor 30 which is connected to one of the end terminals of adjustable resistance 31. The other end terminal of resistance 31 is connected through conductor 32 to fixed contact member 33 of relay 34, the other fixed contact member 35 of which is connected through conductor 36 to the middle terminal of adjustable resistance 31. The movable member 37 of relay 34 is electrically connected to conductor 38 which in turn is connected to cable 23.

Choke 39 is positioned adjacent movable contact member 37 and is adapted when energized to move and retain movable contact member 37 in contact with fixed contact member 35. One end of the coil of choke 39 is connected to cable 22 through conductor 40, the other end being connected to cable 23 through conductor 41. For convenience conductor 41 has been shown as connected to roller 20. On the other side of movable contact member 37 is fastened one end of a spring 42 the other end of which is anchored to a fixed part of the machine 1. Spring 42 is of such strength that it will move movable contact member 37 out of contact with fixed contact member 35 and into contact with fixed contact member 33 when the pull exerted by choke 39 lessens due to welding electrode 8 touching work 3.

Movable contact member 37 has also connected to it, through a suitable linkage, on the same side as spring 42 a definite time delay device 43. Definite time delay device 43 will not be described in detail as it is a device well known in the art. Definite time delay device 43 may be either electrical or mechanical, though at present I prefer that it be mechanical. Definite time delay device 43 should be such that it will hold movable contact member 37 in contact with fixed contact member 33 against the pull of the choke 39 for a period of time somewhat less than the period required to reestablish the arc.

Prior to the commencement of the welding operation the control arrangements within casing 25 are adjusted as required and adjustable resistance 31 set to the voltage setting necessary for the arc of predetermined length. After which switch 28 is closed and a section of welding electrode 8 is passed through guides 17 to feeding wheel 6. Feeding wheel 6 will pass the section of welding electrode 8 through contact device 19 to work 3. Care should be taken to assure that the exposed areas of the section are aligned with rollers 20. Switch 24 is then closed.

At this time choke 39 will be energized and movable contact member 37 will be in contact with fixed contact member 35 so that the resistance in the circuit of the arc control arrangements is such as corresponds to the voltage setting of the arc of predetermined length. When welding electrode 8 touches work 3 as the arc is initially struck, the flow of current through the coil of choke 39 will be reduced to a minimum and its pull will no longer be sufficient to overcome the pull of spring 42 with the result that movable contact member 37 will move into contact with fixed contact member 33. At this time the arc control arrangements will be subject to a much higher voltage setting since all of the resistance of adjustable resistance 31 is now in the circuit of the arc control arrangements. The effect of the high voltage setting is to decrease the feed of the welding electrode and consequently the arc will increase in length.

As welding electrode 8 separates from work 3 the resistance of the welding current path will increase with the result that current flow through the coil of choke 39 as well as the pull of choke 39 will increase. However due to definite time delay device 43 movable contact 37 will not immediately move to fixed contact 35 but will remain on fixed contact 33 for a predetermined period of time. The period generally is long enough to allow the arc to lengthen beyond the predetermined length so that after movable contact member 37 moves back to fixed contact member 35, to place the arc control arrangements under the influence of the voltage setting required to maintain the arc of predetermined length, the control arrangements will cause the arc to shorten to the predetermined length. After the arc of predetermined length is established movable contact 37 will remain on fixed contact 35 as the welding proceeds. Should the arc for any reason be broken while welding, relay 34 will again operate as just described during the reestablishment of the arc.

As the welding continues and the top of the first section of welding electrode 8 approaches feeding wheel 6 a second section is passed through guides 17 and joined to the top of the first section, care being taken to align the exposed areas of the sections. This is repeated from time to time as required and the welding carried out as long as is necessary.

In Fig. 2 I have shown adjustable resistance 31, relay 34, choke 39 and definite time delay device 43 as located outside of casing 25. This has been done to simplify the disclosure. If desired, the elements just mentioned may be located within casing 25.

I claim:

1. In electric arc welding apparatus, means for feeding an electrode to the work, means including an electrical circuit for controlling said electrode feeding means to maintain an arc of predetermined length, and means for increasing the resistance of said circuit during a predetermined interval after striking the arc.

2. In combination with electric arc welding apparatus, welding current supply means, a welding electrode having a covering of non-conducting material, means for feeding the electrode to the arc, means for passing the welding current from said welding current supply means to said electrode on its way to the arc, means for controlling said electrode feeding means to maintain an arc of predetermined length, means connecting said control means to one side of said current supply means, means connecting said control means to the other side of welding current supply means, a resistance in said second connecting means, and means for increasing the value of said resistance upon striking and during the establishing of the arc.

3. In combination with electric arc welding apparatus, welding current supply means, a welding electrode having a covering of non-conducting material, means for feeding the electrode to the arc, means for passing the welding current from said welding current supply means to said electrode on its way to the arc, means for controlling said electrode feeding means to maintain an arc of predetermined length, means connecting said control means to one side of said welding current supply means, a resistance having a terminal at each end thereof and a terminal intermediate its ends, means connecting said control means to one of said end terminals, and means connected to the other side of said welding current supply means adapted during welding to connect to said intermediate terminal and during the establishing of the arc to connect to said other end terminal.

4. In combination with electric arc welding apparatus, welding current supply means, a welding electrode having a covering of non-conducting material, means for feeding the electrode to the arc, means for passing the welding current from said welding current supply means to said electrode on its way to the arc, means for controlling said electrode feeding means to maintain an arc of predetermined length, means connecting said control means to one side of said welding current supply means, a resistance having a terminal at each end thereof and a terminal intermediate its ends, means connecting said control means to one of said end terminals, a pair of spaced fixed contact members, means connecting one of said fixed contact members to the other of said end terminals, means connecting the other of said fixed contact members to said intermediate terminal, a movable contact member adapted to contact with said other of said fixed contact members during welding and to contact with said one of said fixed contact members during establishing of the arc, and means connecting said movable contact member with the other side of said welding current supply.

5. In combination with electric arc welding apparatus adapted to carry on welding by means of an arc struck between the work and a covered fusible electrode, means for feeding the electrode to the work, welding current supply means, means connecting one side of said welding current supply means to the work, means for connecting the other side of said welding current supply means to said electrode as it passes to the work, means for controlling said electrode feeding means to maintain an arc of predetermined length, means connecting said control means to one side of the welding current supply means, a resistance having a terminal at each end thereof and a terminal intermediate its ends, means connecting one of said end terminals to said control means, a pair of spaced fixed contact members, means connecting the other of said end terminals to one of said fixed contact members, means connecting the other of said fixed contact members to the intermediate terminal, a movable contact member, means connecting said movable contact member to the other side of said current supply means, means constantly urging said movable contact member into contact with said one of said fixed contact members, energizable means effective during welding and open circuit to urge said movable contact member into contact with said other of said fixed contact members, said energizable means exerting a greater pull than said constantly urging means, and means holding said movable contact means in contact with said one of said fixed contact members until the arc exceeds the predetermined length.

6. In combination with electric arc welding apparatus adapted to carry on welding by means of an arc struck between the work and a covered fusible electrode, means for feeding the electrode to the work, welding current supply means, means connecting one side of said welding current supply means to the work, means for connecting the other side of said welding current supply means to said electrode as it passes to the work, means for controlling said electrode feeding means to maintain an arc of predetermined length, means connecting said control means to one side of said current supply means, a resistance having a terminal at each end thereof, and a terminal intermediate its ends, means connecting one of said terminals to said control means, a pair of spaced fixed contact members, means connecting the other of said end terminals to one of said fixed contact members, means connecting the other contact members, means connecting the other of said fixed contact members to said intermediate terminal, a movable contact member, means connecting said movable contact member to the other side of said current supply means, means normally urging said movable contact member into contact with said one fixed contact member, means connected to both sides of said welding current supply means adapted to exert a pull on said movable contact member sufficient to overcome said normally urging means and to move said movable contact member into contact with said other contact member when the welding circuit is open and during welding but insufficient to overcome said normally urging means when the welding circuit is initially closed, and means for holding said movable contact member in contact with said one fixed contact member for a predetermined interval of time after the welding circuit is closed.

7. In combination with electric arc welding apparatus adapted to carry on the welding by means of an arc struck between the work and a covered fusible electrode, means for feeding the electrode to the work, welding current supply means, means connecting one side of said welding current supply means to the work, means for connecting the other side of said welding current supply means to said electrode as it passes to the work, means for controlling said electrode feeding means to maintain an arc of predetermined length, means connecting said control means to one side of said current supply means, a resistance having a terminal at each end thereof and a terminal intermediate its ends, means connecting one of said end terminals to said control means, a pair of spaced fixed contact members, means connecting the other of said end terminals to one of said fixed contact members, means connecting the other of said fixed contact members to said intermediate terminal, a movable contact member, means connecting said movable contact member to the other side of said current supply means, means normally urging said movable contact member into contact with said one fixed contact member, a choke connected to both sides of said current supply means adapted to be energized on open welding circuit and during welding to move said movable contact member into contact with said other fixed contact member, and means including a definite time delay device adapted to hold said movable contact member in contact with said one fixed contact member for a definite period of time after the welding circuit is closed.

ROBERT K. HOPKINS.